(12) United States Patent
Keck (10) Patent No.: US 12,480,346 B2
(45) Date of Patent: Nov. 25, 2025

(54) FURNITURE FITTING

(71) Applicant: Julius Blum GmbH, Hoechst (AT)

(72) Inventor: Maximilian Keck, Hard (AT)

(73) Assignee: JULIUS BLUM GMBH, Hoechst (AT)

( * ) Notice: Subject to any disclaimer, the term of this patent is extended or adjusted under 35 U.S.C. 154(b) by 384 days.

(21) Appl. No.: 17/901,387

(22) Filed: Sep. 1, 2022

(65) Prior Publication Data
US 2023/0018847 A1 Jan. 19, 2023

Related U.S. Application Data

(63) Continuation of application No. PCT/AT2021/060066, filed on Feb. 25, 2021.

(30) Foreign Application Priority Data

Mar. 3, 2020 (AT) .......................... GM 50036/2020

(51) Int. Cl.
*E05F 1/12* (2006.01)
*E05D 3/06* (2006.01)
(Continued)

(52) U.S. Cl.
CPC .............. *E05F 1/1261* (2013.01); *E05D 3/06* (2013.01); *E05D 3/16* (2013.01); *E05F 3/18* (2013.01);
(Continued)

(58) Field of Classification Search
CPC ...... E05D 3/06; E05D 3/16; E05F 3/18; E05F 3/20; E05F 1/1261; E05F 1/1276; E05Y 2201/604
See application file for complete search history.

(56) References Cited

U.S. PATENT DOCUMENTS 9,719,283 B2 * 8/2017 Holzapfel .............. A47B 96/00
10,590,688 B2    3/2020 Salice
(Continued)

FOREIGN PATENT DOCUMENTS

AT        515493 A1 * 9/2015 ............. A47B 96/00
CN     105683472        6/2016
(Continued)

OTHER PUBLICATIONS

International Search Report issued May 27, 2021 in International (PCT) Application No. PCT/AT2021/060066.

*Primary Examiner* — Jeffrey O'Brien
(74) *Attorney, Agent, or Firm* — Wenderoth, Lind & Ponack, L.L.P.

(57) ABSTRACT

A furniture fitting is pivotable relative to a furniture carcass, and includes a housing to be arranged on or in a furniture panel of a furniture carcass, and a positioning arm mounted to be movable relative to the housing. The positioning arm is movable between a first maximum position, corresponding to a closed position of the movably mounted furniture part, and a second maximum position, corresponding to a maximum open position of the movably mounted furniture part. The housing has a front side and a fastening interface via which the movable furniture part is fastenable on the positioning arm. The fastening interface has a contact surface for contacting the movably mounted furniture part. The contact surface is arranged, in the first maximum position, in a plane of the front side of the housing and, in the second maximum position, in a plane perpendicular to the plane of the front side.

16 Claims, 7 Drawing Sheets

(51) Int. Cl.
  *E05D 3/16* (2006.01)
  *E05F 3/18* (2006.01)
  *E05F 3/20* (2006.01)

(52) U.S. Cl.
  CPC ........... *E05F 3/20* (2013.01); *E05Y 2201/604* (2013.01); *E05Y 2900/20* (2013.01)

(56) References Cited

U.S. PATENT DOCUMENTS

| | | | |
|---|---|---|---|
| 10,881,207 B2 * | 1/2021 | Sobolewski | F16B 12/14 |
| 10,927,577 B2 * | 2/2021 | Kruedener | E05D 5/0276 |
| 10,968,670 B2 * | 4/2021 | Kruedener | E05D 3/06 |
| 10,968,672 B2 * | 4/2021 | Schmid | E05F 1/1261 |
| 11,085,218 B2 * | 8/2021 | Herper | E05F 1/1276 |
| 11,248,406 B2 * | 2/2022 | Nordieker | E05F 1/1058 |
| 11,306,522 B2 * | 4/2022 | Holzapfel | E05F 1/1058 |
| 11,319,737 B2 * | 5/2022 | Nordieker | E05D 15/40 |
| 11,359,428 B2 * | 6/2022 | Schärer | E05F 3/04 |
| 11,525,295 B2 * | 12/2022 | Nordieker | E05F 3/18 |
| 11,598,136 B2 * | 3/2023 | Güzeltepe | E05F 3/20 |
| 11,603,687 B2 * | 3/2023 | Giovannetti | E05F 5/02 |
| 11,603,693 B2 * | 3/2023 | Güzeltepe | E05F 3/20 |
| 11,746,580 B2 * | 9/2023 | Lee | E05D 3/16 16/358 |
| 11,970,893 B2 * | 4/2024 | Holzapfel | E06B 3/443 |
| 12,000,188 B2 * | 6/2024 | Schmid | E05D 15/40 |
| 12,037,825 B2 * | 7/2024 | Boesch | E05D 3/06 |
| 12,116,819 B2 * | 10/2024 | Baldreich | E05D 7/125 |
| 12,129,700 B2 * | 10/2024 | Holzapfel | E05D 15/40 |
| 12,158,034 B2 * | 12/2024 | Gabel | E05D 15/40 |
| 2012/0118842 A1 * | 5/2012 | Salice | E05F 1/1284 211/144 |
| 2014/0317883 A1 * | 10/2014 | Baldreich | E05F 1/1261 16/280 |
| 2016/0168896 A1 | 6/2016 | Holzapfel | |
| 2017/0241175 A1 | 8/2017 | Hammerer | |
| 2018/0058123 A1 | 3/2018 | Salice | |
| 2019/0093404 A1 | 3/2019 | Schmid | |
| 2019/0309554 A1 | 10/2019 | Schärer et al. | |
| 2019/0316397 A1 * | 10/2019 | Kruedener | E05D 15/46 |
| 2020/0131818 A1 | 4/2020 | Sobolewski et al. | |
| 2020/0224477 A1 | 7/2020 | Sobolewski et al. | |
| 2021/0189780 A1 * | 6/2021 | Nordieker | E05F 11/54 |
| 2021/0404230 A1 * | 12/2021 | Giovannetti | E05D 3/18 |
| 2022/0056745 A1 * | 2/2022 | Holzapfel | E05F 5/02 |
| 2022/0056747 A1 | 2/2022 | Holzapfel | |
| 2022/0074248 A1 * | 3/2022 | Holzapfel | E05D 15/40 |
| 2023/0018847 A1 * | 1/2023 | Keck | E05F 5/02 |
| 2023/0088619 A1 * | 3/2023 | Cai | E05F 5/08 16/382 |
| 2023/0265699 A1 * | 8/2023 | Baldreich | E05F 1/14 49/381 |
| 2023/0272648 A1 * | 8/2023 | Baldreich | E05F 1/10 312/325 |
| 2023/0272649 A1 * | 8/2023 | Baldreich | E05D 5/0276 312/325 |
| 2023/0272655 A1 * | 8/2023 | Baldreich | E05D 15/40 49/381 |
| 2023/0340818 A1 * | 10/2023 | Schmid | E05D 13/12 |
| 2024/0263500 A1 * | 8/2024 | Geller | E05D 5/0276 |

FOREIGN PATENT DOCUMENTS

| | | |
|---|---|---|
| CN | 107002442 | 8/2017 |
| CN | 109415920 | 3/2019 |
| CN | 209369568 | 9/2019 |
| CN | 110832162 | 2/2020 |
| DE | 11 2016 001 573 | 12/2017 |
| DE | 11 2017 114 774 | 1/2019 |
| EP | 2 712 988 | 4/2014 |
| EP | 3 401 481 | 11/2018 |
| EP | 3 633 126 | 4/2020 |
| JP | 2018-508677 | 3/2018 |
| WO | 2011/045148 | 4/2011 |
| WO | 2018/024379 | 2/2018 |
| WO | 2018/204957 | 11/2018 |
| WO | 2019/091967 | 5/2019 |
| WO | 2020/232485 | 11/2020 |

* cited by examiner

FURNITURE FITTING

BACKGROUND OF THE INVENTION

The invention relates to a furniture fitting for moving a furniture part mounted to be movable relative to a furniture carcass. In particular, the furniture part is a furniture flap pivotable relative to the furniture carcass about a horizontal axis. The furniture fitting includes a housing to be arranged on or in a furniture panel of the furniture carcass, and at least one positioning arm mounted to be movable relative to the housing. The at least one positioning arm is movable between a first maximum position, which corresponds to a closed position of the movably mounted furniture part, and a second maximum position, which corresponds to a maximum open position of the movably mounted furniture part. The housing has a front side through which the at least one positioning arm protrudes in at least the second maximum position, and at least one fastening interface via which the movable furniture part is fastenable on the at least one positioning arm. The at least one fastening interface has at least one contact surface for contacting the movably mounted furniture part. The invention furthermore relates to a piece of furniture having at least one such furniture fitting.

Such furniture fittings are already known from the state of the art. They are used in kitchens for the closure of wall units arranged above a countertop by furniture flaps.

Although this application is often used, presently known furniture fittings are for example not suitable for use with downwardly openable bar flaps. Here, in the state of the art, use is made of technically poorly conceived solutions such as e.g. cable pulls, or hinge-like fittings which are constructed such that they do not allow the integration of additional movement technology such as e.g. dampers. Such a hinge-like fitting is disclosed in DE 11 2016 001 573 T5. This solution from the state of the art additionally has the disadvantage that a milled recess, into which a part of the furniture fitting is inserted, must be formed in a laborious manner in the furniture part to be moved.

SUMMARY OF THE INVENTION

The object of the present invention is to expand the possibilities for use of the generic furniture fittings and, for example, also to make these usable for downwardly openable bar flaps. It is also sought to specify a piece of furniture having at least one furniture fitting that has been improved in such a way.

Accordingly, in the case of the furniture fitting according to the invention, the at least one contact surface is arranged, in the first maximum position, substantially in a plane of the front side of the housing and, in the second maximum position, substantially in a plane that is oriented perpendicular to the plane of the front side.

These measures have the advantage that the maximum opening angle of the furniture fitting is 90°. As a result, if the furniture fitting is used for a downwardly openable bar flap, the bar flap can be arranged in the same horizontal plane as a base panel of a furniture carcass on which the bar flap is fastenable by the furniture fitting. In this way, the surface area provided by the base panel can be enlarged by the bar flap in the second maximum position of the at least one positioning arm. Due to the orientation in a horizontal plane, articles can be arranged on the bar flap without the risk of the articles slipping off under the influence of gravitational force. By comparison, the generic furniture fittings of the state of the art have an opening angle of greater than 90° and are therefore not suitable for the movement of a downwardly openable bar flap.

One advantage of the arrangement, in the first maximum position of the at least one positioning arm, of the at least one contact surface substantially in the plane of the front side of the housing is that, for the fastening of the furniture part to be moved on the at least one positioning arm via the at least one fastening interface, no milled recesses are required in the furniture part to be moved, because, in the first maximum position, the at least one positioning arm can be arranged entirely in the housing. By comparison, for example in the case of the solution according to DE 11 2016 001 573 T5, a recess, in which a part of the at least one positioning arm can be arranged in the closed position, must be created in the material of the furniture flap.

According to one preferred embodiment, the furniture fitting has at least one spring device with which a force can be exerted on the at least one positioning arm. Preferably the furniture fitting has at least one force-transmitting lever via which the at least one spring device is connected to the at least one positioning arm. As a result, a particularly advantageous movement of the at least one positioning arm and of a furniture part that is fastenable thereon can be realized, and user convenience can be increased. The force that can be exerted can serve, for example, to compensate for a weight of the furniture part, such that a user only has to apply a small force in order to move the furniture part. Alternatively or in addition, the force that can be exerted by the at least one spring device can be used to actively move the furniture part into the first and/or second maximum position.

In conjunction with this preferred embodiment, it has proved to be advantageous that the furniture fitting has a setting device with which the force that can be exerted on the at least one positioning arm by the at least one spring device is settable. Preferably, a preload of the at least one spring device and/or a position of a force coupling point of the at least one spring device with respect to the at least one positioning arm is settable by the setting device, and/or the at least one spring device is mounted pivotably on the housing, preferably directly or indirectly via a rocker. Through these measures, the furniture fitting can be even better adapted to the parameters of a furniture part to be moved and to user requirements.

It has proved to be expedient that the at least one positioning arm is connected to the housing via a lever mechanism. Preferably, the lever mechanism is formed as a three- or seven-bar arrangement, and/or has three or four levers, and/or has two articulation points on the housing side, and/or has one or two articulation points on the positioning arm side, and/or has a toothed gear arrangement with at least one rotatably mounted toothed gear and/or at least one toothed ring portion, and/or has a cover at least in regions. These measures, individually or in combination with one another, are particularly suitable for realizing a movement of the at least one positioning arm between the two maximum positions. A particular advantage is that that part of the lever mechanism which is arranged outside the housing in the second maximum position is arranged as close as possible to the furniture part to be moved, and thus takes up little installation space, whereby good lateral access to an interior space of the furniture carcass is ensured.

A particularly advantageous movement of the at least one positioning arm and of a furniture part that is fastenable thereon can be realized by virtue of the furniture fitting having at least one damping device, which is preferably formed as a linear damper, and at least one coupling device, with which the at least one positioning arm is couplable or coupled to the at least one damping device. A movement of the at least one positioning arm proceeding from at least one intermediate position, which is arranged between the two maximum positions, into the first maximum position and/or into the second maximum position can be dampened by the at least one damping device. Preferably, the at least one coupling device comprises at least one, particularly preferably angled, lever, at least one driver, and/or at least one actuator. These measures, individually or in combination with one another, can particularly advantageously also be combined with other measures in order to yet further improve the movement of the at least one positioning arm, and of a furniture part that is fastenable thereon, for a user.

One preferred embodiment consists in that the furniture fitting comprises at least one fastening device for the fastening of the furniture fitting on or in a furniture panel of the furniture carcass. Preferably, the at least one fastening device comprises at least one rotatably mounted actuating element and at least one fastening element that can, at least in regions, be sunk in a wall of a recess of the furniture panel and/or pressed onto the wall. A conversion device is provided with which a rotational movement of the at least one actuating element can be converted into a sinking-in movement and/or into a pressing-on movement of the at least one fastening element.

As stated at the beginning, protection is also sought for a piece of furniture. The piece of furniture comprises a furniture carcass and at least one furniture part mounted so as to be movable relative to the furniture carcass, the furniture part preferably being at least one furniture flap pivotable relative to the furniture carcass about a horizontal axis in a position of use of the piece of furniture. The piece of furniture furthermore has at least one furniture fitting according to the invention. The furniture carcass comprises at least one, preferably vertically arranged, furniture panel, and the housing of the at least one furniture fitting is arranged on or in the furniture panel. The at least one furniture part is fastened or fastenable on the at least one positioning arm of the at least one furniture fitting via the at least one fastening interface.

Preferred embodiments of the piece of furniture, individually or in combination with one another, are characterized in that the housing of the at least one furniture fitting is, with the exception of the front side, arranged entirely in the at least one furniture panel of the furniture carcass, and/or wherein the housing of the at least one furniture fitting is arranged at a bottom edge of the at least one furniture panel in a position of use of the piece of furniture. By way of an arrangement entirely in the at least one furniture panel, it is possible to design pieces of furniture that are particularly visually appealing. Furthermore, as a result, no stowage space is taken up that would otherwise be lost in the case of an arrangement on a side surface of the at least one furniture panel and in the interior of the furniture carcass.

It has proved to be particularly expedient that the at least one furniture part is formed as a furniture flap pivotable relative to the furniture carcass about an axis that is horizontal in a position of use of the piece of furniture. The furniture flap is openable downward proceeding from the first maximum position in the direction of the second maximum position. This configuration is used for example in the case of a bar flap.

In this context, it has proved to be advantageous that the furniture flap has an inner surface, which in the first maximum position faces toward the furniture carcass, and an outer surface, which is spaced apart from said inner surface by a material thickness of the furniture flap. The furniture carcass has a base panel with an inner surface that delimits an interior space of the furniture carcass in regions, and the inner surface of the base panel and the inner surface of the furniture flap are, in the second maximum position, arranged substantially in a common plane.

BRIEF DESCRIPTION OF THE DRAWINGS

Further details and advantages of the invention will be explained in more detail below with reference to the drawings, in which.

DETAILED DESCRIPTION OF THE INVENTION

Figure 1A:
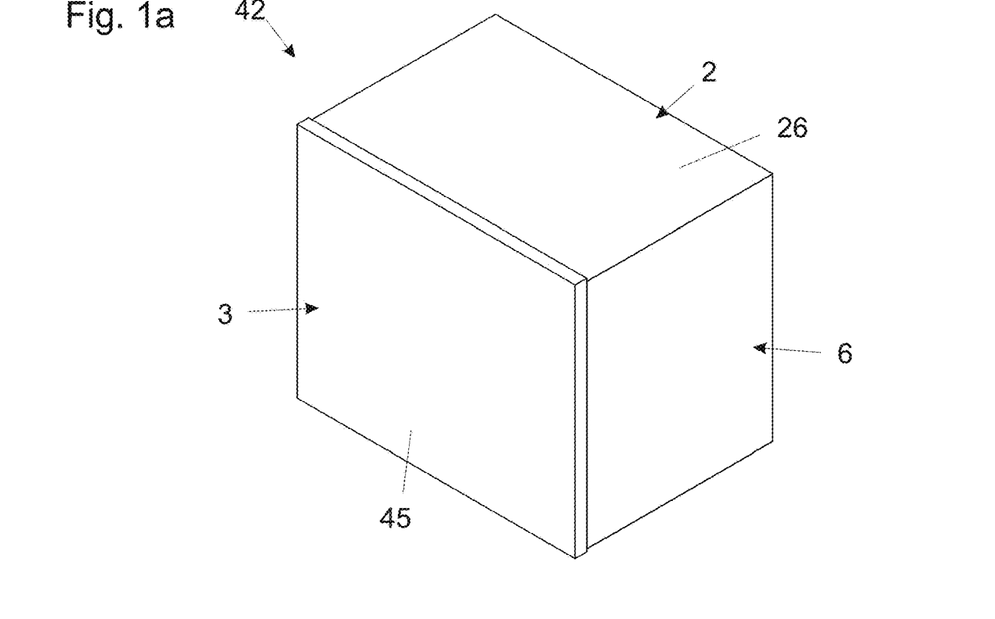
FIGS. 1a)-c) show a piece of furniture according to a first embodiment in a schematically illustrated perspective view, wherein the furniture flap is closed in partial figure a), is open in partial figure b), and has been removed in partial figure c), FIGS. 2a), b) show a furniture fitting according to the first embodiment, wherein the positioning arm is arranged in the first maximum position, and wherein partial figure a) shows a schematically illustrated perspective view and partial figure b) shows a schematically illustrated view from the side, with a side surface of the housing not being illustrated.
Figure 1B:
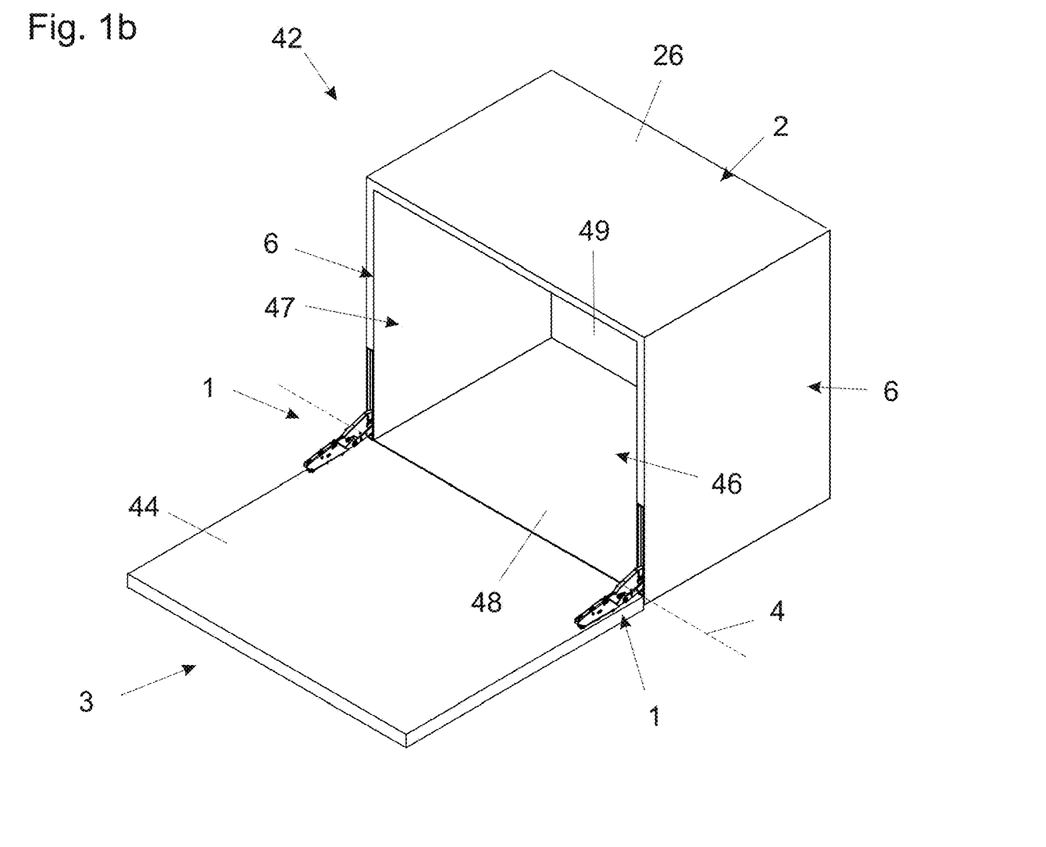
Figure 1C:
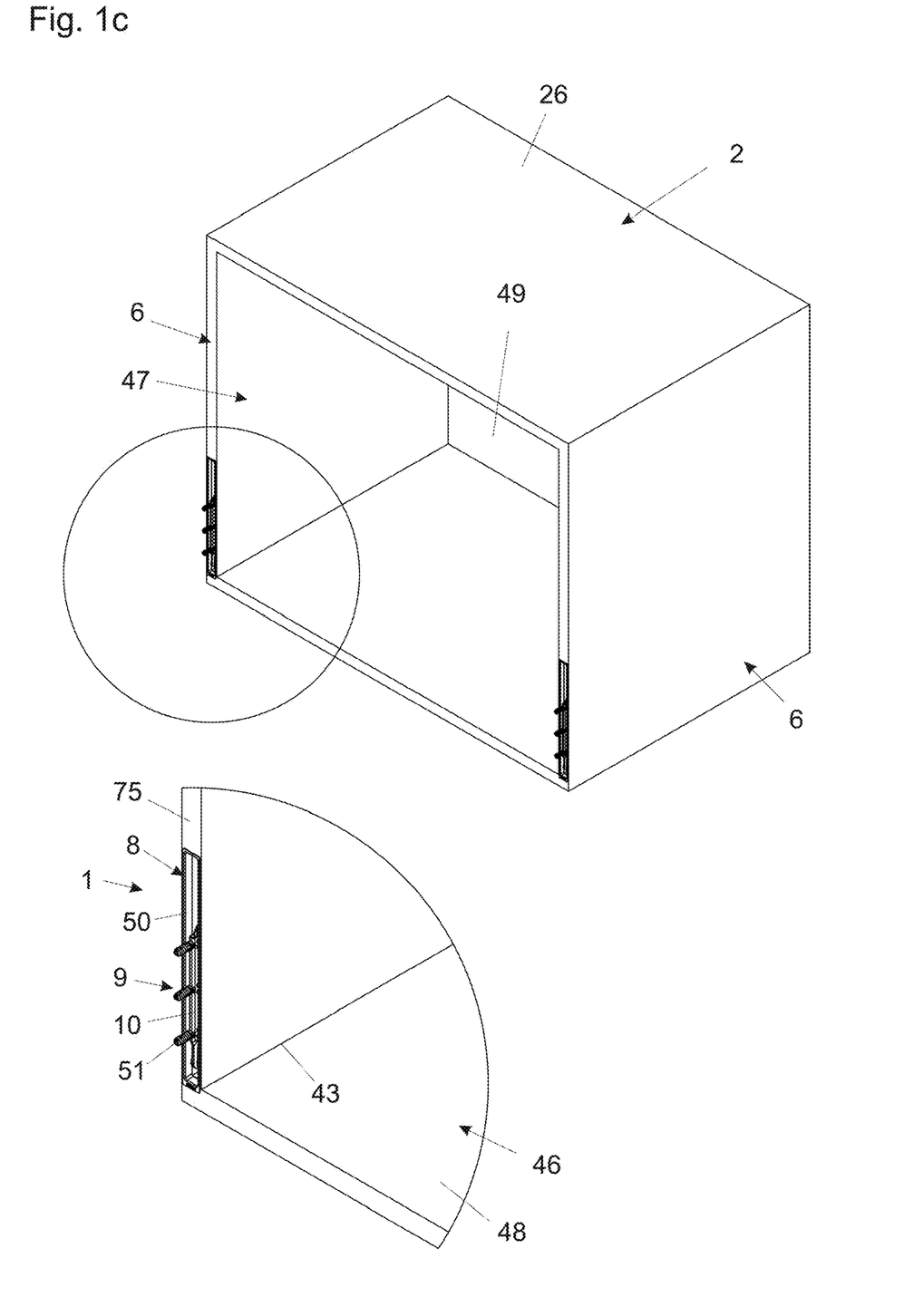

FIGS. 1a) to 1c) show a piece of furniture 42 according to a first embodiment.

The piece of furniture 42 has a furniture carcass 2 and a furniture part 3 that is mounted so as to be movable relative to the furniture carcass 2. The furniture part 3 is formed as a furniture flap pivotable relative to the furniture carcass 2 about a horizontal axis 4 in a position of use of the piece of furniture 42.

The piece of furniture 42 has two furniture fittings 1 with which the furniture part 3 is movable relative to the furniture carcass 2. The furniture fittings 1 can be formed according to one of the embodiments illustrated in the figures that follow.

The furniture carcass 2 has two vertically arranged furniture panels 6. A housing 5 of each of the furniture fittings 1 is arranged in a respective furniture panel 6, and the furniture part 3 is fastened or fastenable on (in each case) one positioning arm 7 of the furniture fittings 1 via in each case one fastening interface 9.

The housing 5 of each of the furniture fittings 1 is, with the exception of the front side 8, arranged entirely in a respective one of the furniture panels 6 of the furniture carcass 2, and at a bottom edge 43 of the furniture panels 6 in a position of use of the piece of furniture 42.

For the arrangement of the housings 5 of the furniture fittings 1 in the furniture panels 6, the furniture panels 6 have in each case one recess that is open at a front side 75 of the furniture panels 6.

The furniture part 3 is formed as a furniture flap pivotable relative to the furniture carcass 2 about an axis 4 that is horizontal in a position of use of the piece of furniture 42. The furniture flap is openable downward proceeding from a first maximum position, in which the furniture flap closes an interior space 47 of the furniture carcass, in the direction of a second maximum position, in which the interior space 47 is open.

The furniture flap has an inner surface 44, which in the first maximum position faces toward the furniture carcass 2, and an outer surface 45, which is spaced apart from the inner surface by a material thickness of the furniture flap. The furniture carcass 2 has a base panel 46 with an inner surface 48 that delimits an interior space 47 of the furniture carcass 2 in regions. The inner surface 48 of the base panel 46 and the inner surface 44 of the furniture flap are, in the second maximum position, arranged substantially in a common plane 12, wherein the plane 12 is oriented horizontally.

The furniture part 3 can also be referred to as a bar flap with furniture fittings integrated into the side walls of the furniture carcass 2.

The furniture carcass 2 has a top panel 26 and a rear wall 49.

On the front side 8 of the housing 5 of the furniture fittings 1, there may be formed a flange 50 with which a partial region of the front side 75 of the side wall of the furniture carcass 2 can be covered.

Fasteners 51 are provided, via which the furniture part 3 is connectable in each case to a positioning arm 7 of the furniture fittings 1. These can be, e.g., dowels, expansion dowels, or screws.

Figure 2A:
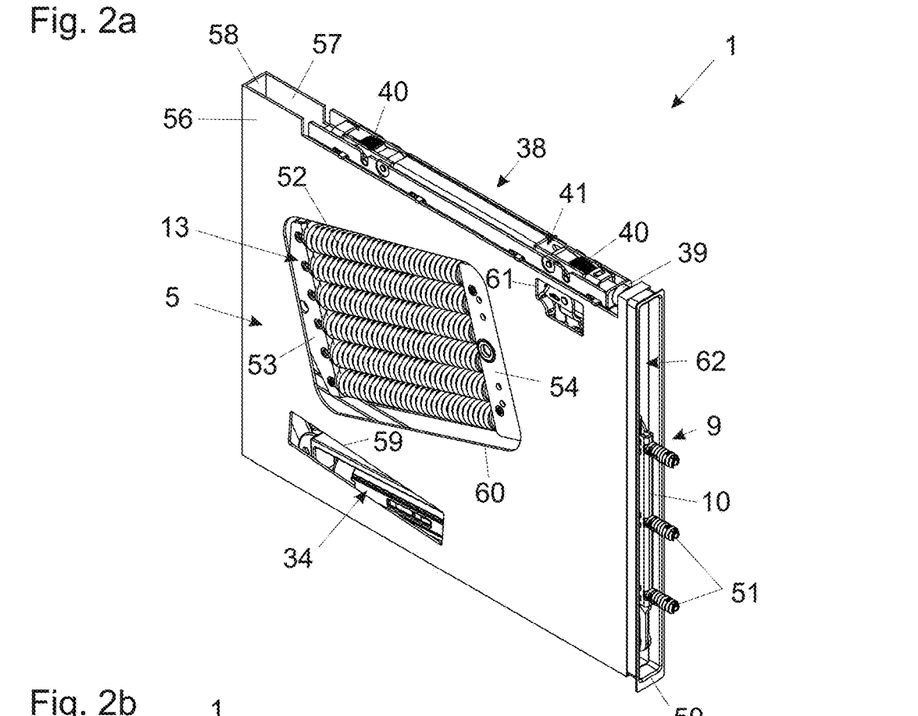
Figure 2B:
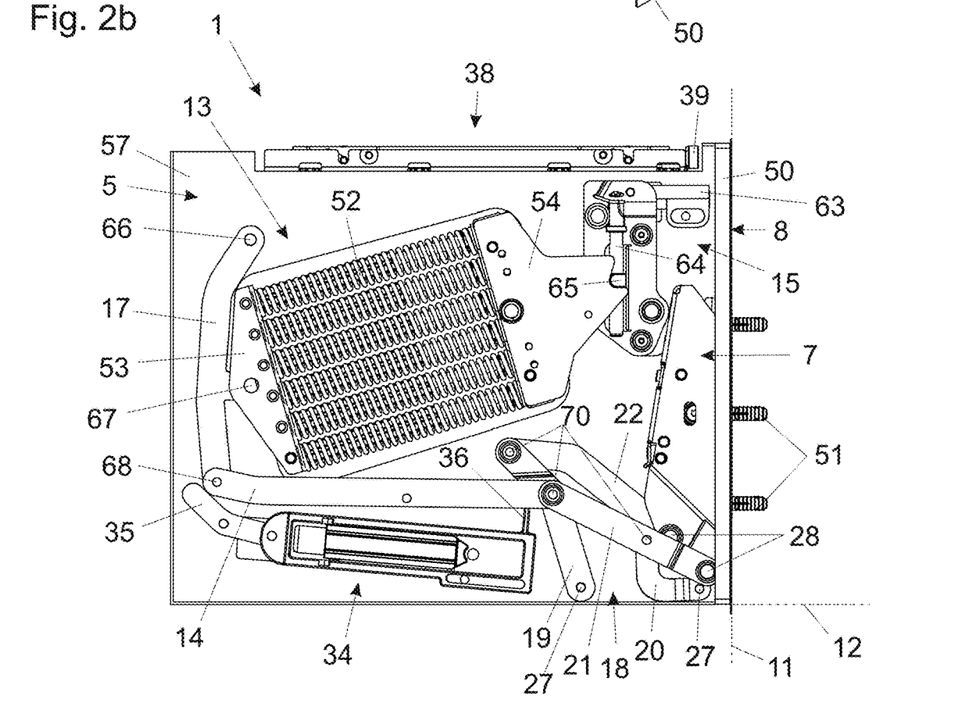

FIGS. 2a) to 5b) show a furniture fitting 1 for moving a furniture part 3 mounted so as to be movable relative to a furniture carcass 2, in particular a furniture flap pivotable relative to the furniture carcass 2 about a horizontal axis 4, according to the first embodiment.

The furniture fitting 1 comprises a housing 5 that can be arranged on or in a furniture panel 6 of the furniture carcass 2, and a positioning arm 7 mounted so as to be movable relative to the housing 5. The positioning arm 7 is movable between a first maximum position, which corresponds to a closed position of the movably mounted furniture part 3, and a second maximum position, which corresponds to a maximum open position of the movably mounted furniture part 3. The housing 5 has a front side 8 through which the positioning arm 7 protrudes in at least the second maximum position. The furniture fitting 1 comprises a fastening interface 9 via which the movable furniture part 3 is fastenable on the positioning arm 7, and the fastening interface 9 has a contact surface 10 for contacting the movably mounted furniture part 3. The contact surface 10, which can be formed flat at least in regions, is arranged, in the first maximum position, substantially in a first plane 11 of the front side 8 of the housing 5 and, in the second maximum position, substantially in a second plane 12 oriented perpendicular to the plane 11 of the front side 8.

The housing 5 comprises a first side surface 56, a second side surface 57 spaced apart from said first side surface, and a rear side 58. Recesses 59, 60, 61, by which it is possible to reduce the width of the housing 5 without the need to reduce the width of components that are arranged in the interior of the housing 5, can be formed in the side surfaces 56 and 57. The recesses 59, 60, 61 can be closed by way of adhesive masking materials.

The front side 8 has an opening 62 through which the positioning arm 7 protrudes in at least the second maximum position.

The furniture fitting 1 has a spring device 13 with which a force can be exerted on the positioning arm 7, and the furniture fitting 1 has a force-transmitting lever 14 via which the spring device 13 is connected, directly or indirectly, to the positioning arm 7.

The furniture fitting 1 has a setting device 15 with which the force that can be exerted on the positioning arm 7 by the spring device 13 is settable. Here, in the case that is specifically illustrated, a preload of the spring device 13 is settable by the setting device 15. Alternatively or in addition, a position of a force coupling point 16 of the spring device 13 with respect to the positioning arm 7 can be settable by the setting device 15.

The spring device 13 is mounted pivotably on the housing 5, in the illustrated case indirectly via a rocker 17. Via an approximately central articulation point 67, the spring device 13 is connected rotatably to the rocker 17. The rocker 17 has a first end, which is connected rotatably to the housing 5 via a pivot point 66 fixed with respect to the housing, and a second end, which is connected to the force-deflecting lever 14 via an articulation point 68.

The spring device 13 can comprise one or more springs 52 which can, as in the illustrated case, be formed as compression springs.

The spring device 13 comprises a first spring carrier 53 and a second spring carrier 54, wherein the one or more springs 52 are or can be arranged between the two spring carriers 53 and 54.

As in the illustrated case, pins 55 can be provided, on which the springs 52 are arranged. The pins 55 serve to protect against buckling.

Figure 5A:
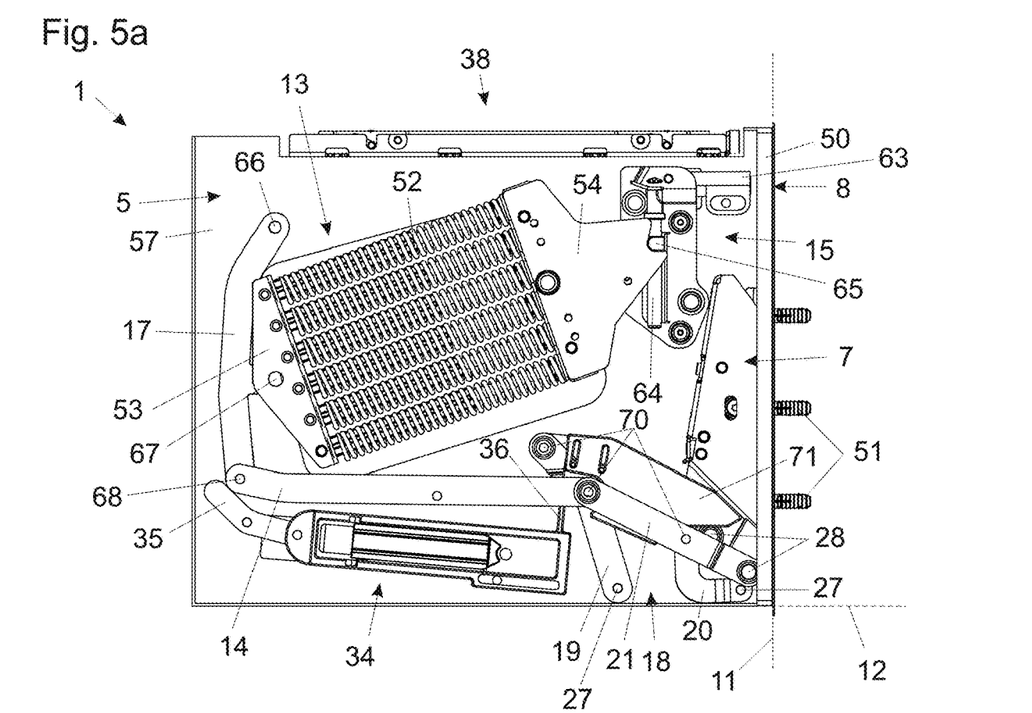
Figure 5B:
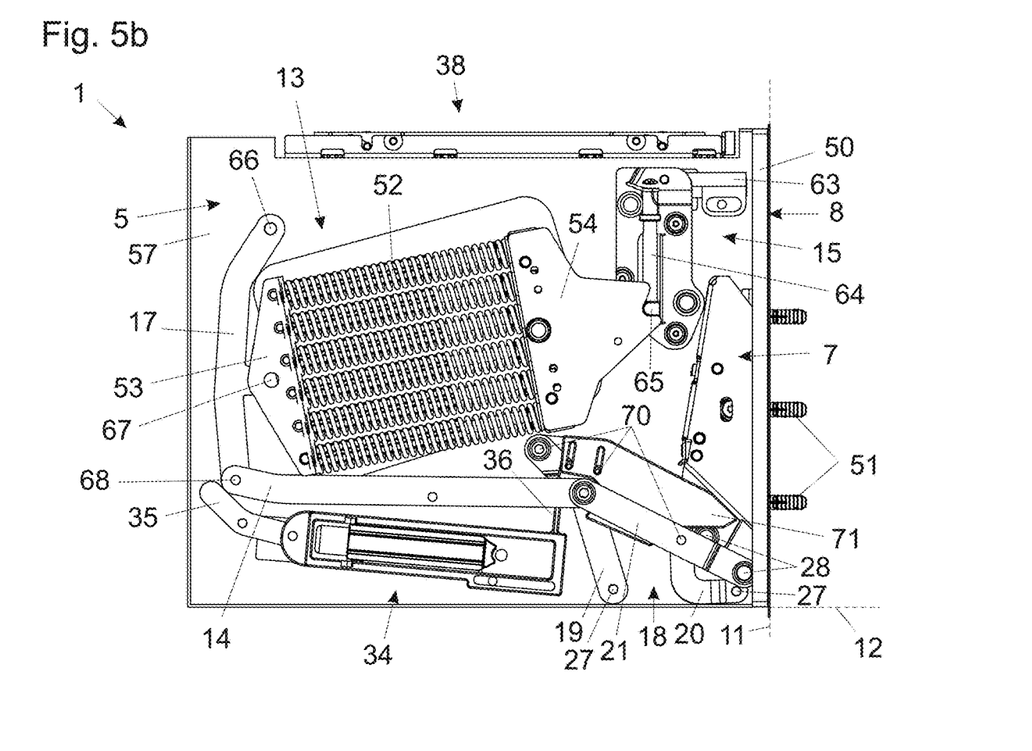

The positioning arm 7 is connected to the housing 5 via a lever mechanism 18. In the case that is specifically illustrated, the lever mechanism 18 is formed as a seven-bar arrangement and has four levers 19, 20, 21, 22, two articulation points 27 on the housing side, and two articulation points 28 on the positioning arm side. The levers 19, 20, 21, 22 and the force-deflecting lever 14 are connected to one another via intermediate articulation points 70. FIGS. 5a) and 5b) illustrate an additional cover 71 with which the lever 22, which is partially arranged outside the housing in the second maximum position, is covered.

The furniture fitting 1 has a damping device 34, which in the specific case is formed as a linear damper, and coupling devices, with which the positioning arm 7 is couplable or coupled to the damping device 34. A movement of the positioning arm 7 proceeding from at least one intermediate position, which is arranged between the two maximum positions, into the first maximum position and into the second maximum position can be dampened by the damping device 34.

A first coupling device part is formed as an angled lever 35, which couples the damping device 34 to the positioning arm 7 in the case of a movement into the first maximum position (cf. FIGS. 4 and 2b)). The lever 35 is, in its center, mounted pivotably on the housing 5 via an articulation point 76 and has a free end that can be contacted by the force-deflecting lever 14. A second end of the lever 35 is connected to the damping device 34.

Figure 3:
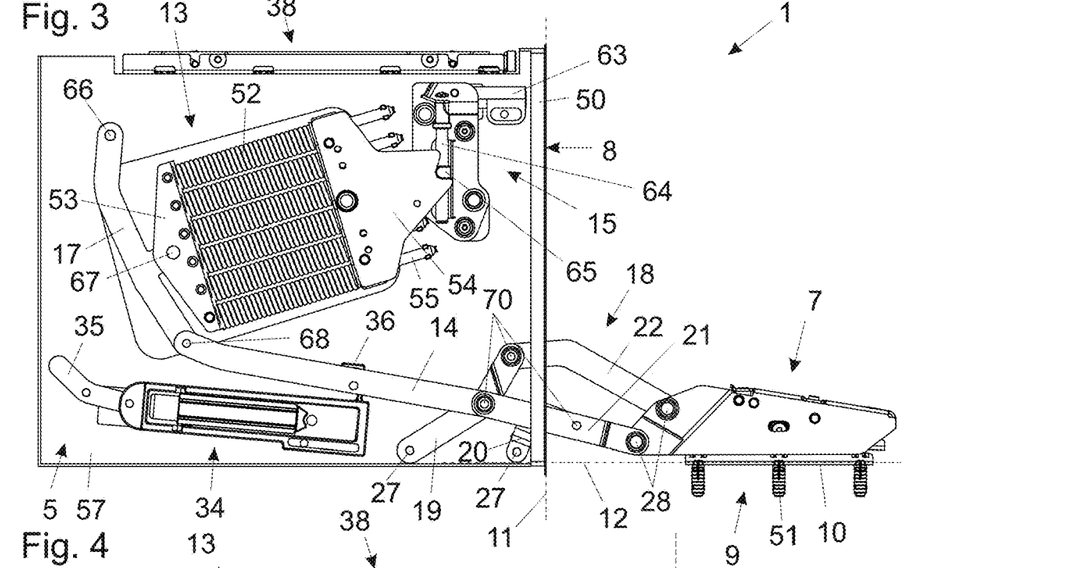
FIG. 3 shows the furniture fitting according to the first embodiment, wherein the positioning arm is arranged in the second maximum position, and wherein a schematically illustrated view from the side can be seen, with a side surface of the housing not being illustrated.
Figure 4:
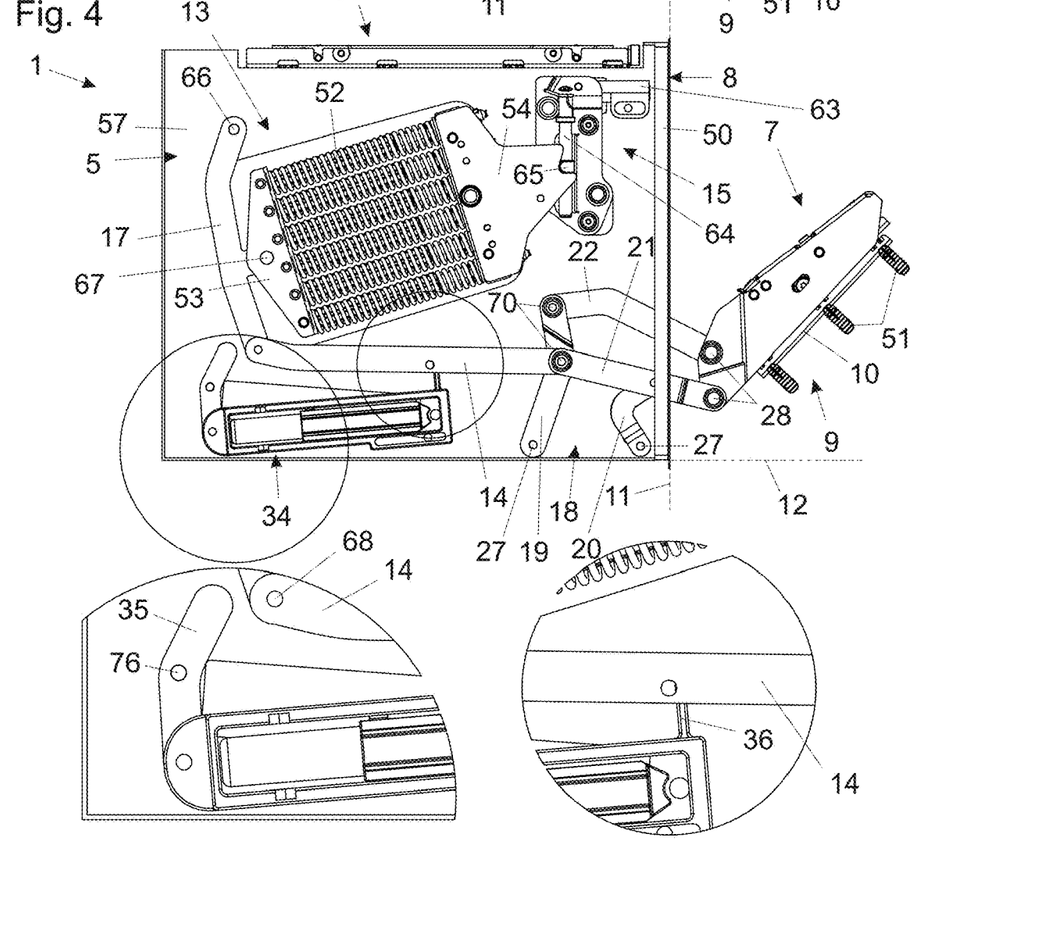
FIG. 4 shows the furniture fitting according to the first embodiment, wherein the positioning arm is arranged in an intermediate position between the two maximum positions, and wherein a schematically illustrated view from the side can be seen, with a side surface of the housing not being illustrated, FIGS. 5a), b) show the furniture fitting according to the first embodiment, wherein the positioning arm is arranged in the first maximum position and the partial figures show two different levels of preload of the spring device, in each case in a schematically illustrated view from the side, with a side surface of the housing not being illustrated, FIG. 6a) shows a piece of furniture according to a second embodiment in a schematically illustrated perspective view, wherein the furniture flap is open, FIG. 6b) shows a furniture fitting according to a second embodiment, wherein the positioning arm is arranged in the second maximum position, and wherein a schematically illustrated view from the side can be seen, with a side surface of the housing not being illustrated.

A second coupling device part comprises a driver 36 arranged on the damping device 34 and couples the damping device 34 to the positioning arm 7 in the case of a movement into the second maximum position (cf. FIGS. 4 and 3).

The furniture fitting 1 comprises a fastening device 38 for the fastening of the furniture fitting 1 on or in a furniture panel 6 of the furniture carcass 2. The fastening device 38 in the embodiment shown comprises a rotatably mounted actuating element 39 and two fastening elements 40 that can, at least partially, be sunk in a wall of a recess of the furniture panel 6 and/or be pressed onto the wall. A conversion device 41 is provided with which a rotational movement of the actuating element 39 can be converted into a sinking-in movement and/or into a pressing-on movement of the fastening elements 40.

FIGS. 5a) and 5b) show the furniture fitting 1 according to the first embodiment, wherein the positioning arm 7 is arranged in the first maximum position and the partial figures show two different levels of preload of the spring device 13.

The setting device 15 comprises a rotatably mounted setting element 63, which can be actuated for example by a screwdriver and which is coupled, e.g. via a bevel gear mechanism, to a threaded spindle 64. An adjusting element 65 is mounted adjustably on the threaded spindle 64. A rotational movement of the setting element 63 is transformed into an adjustment of the adjusting element 65, which is connected to the spring base of the spring device 13. The preload of the spring device 13 is settable in this way.

Figure 6A:
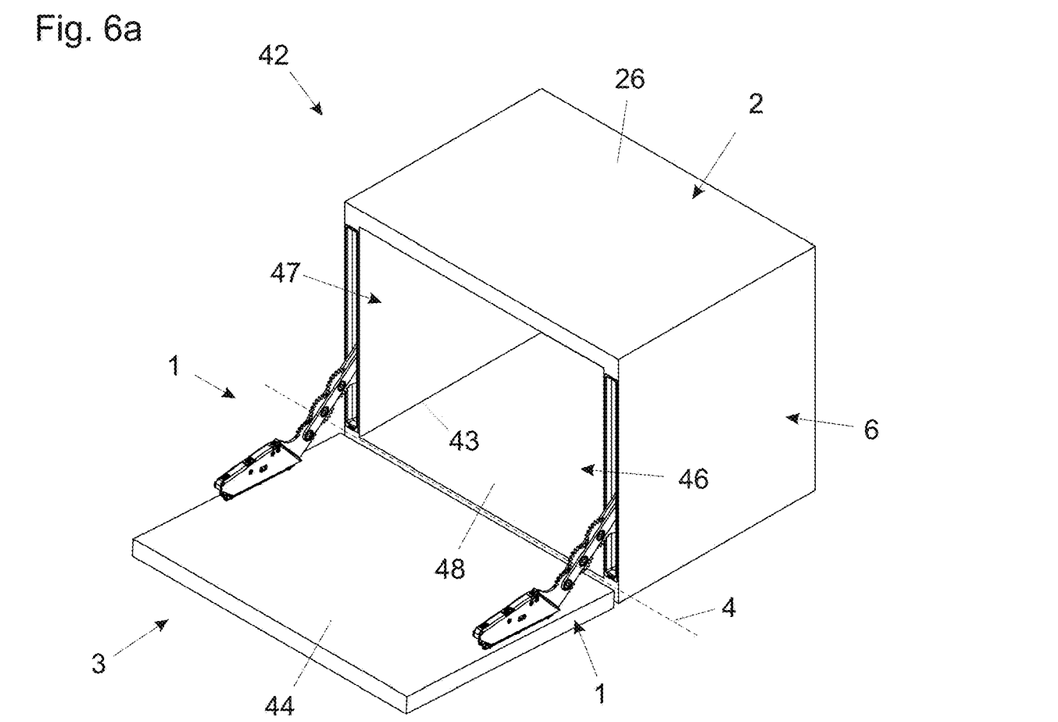
Figure 6B:
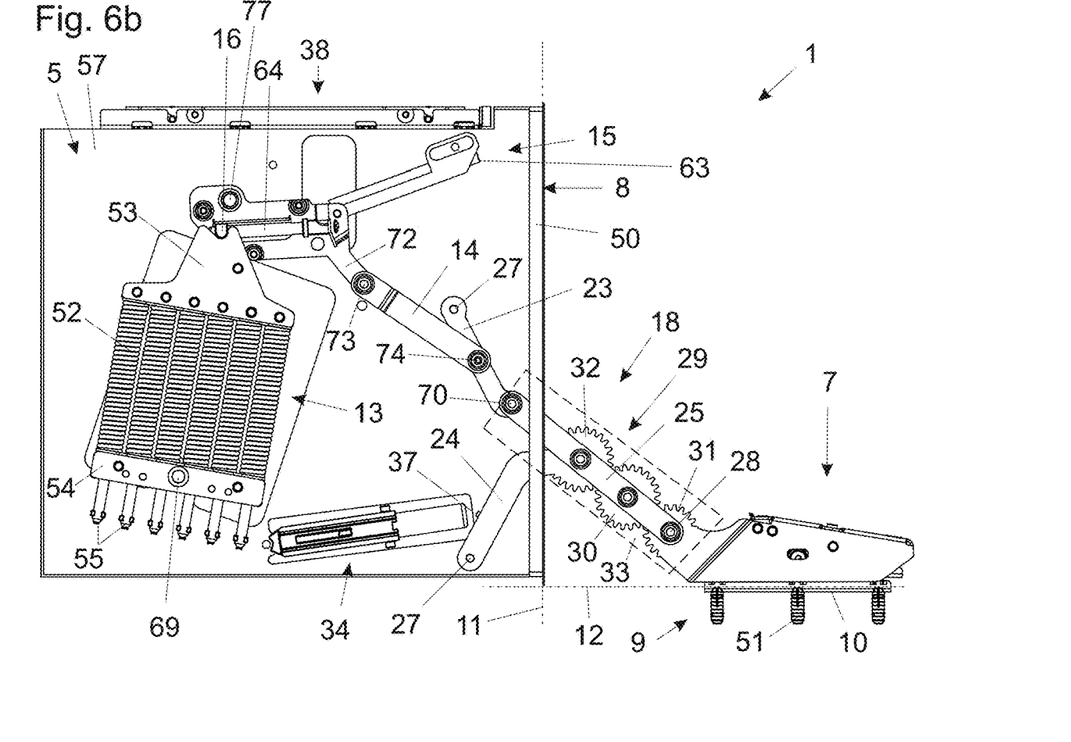

FIG. 6a) shows a piece of furniture 42 according to a second embodiment, and FIGS. 6b) to 8 show a furniture fitting 1 according to a second embodiment.

Figure 7:
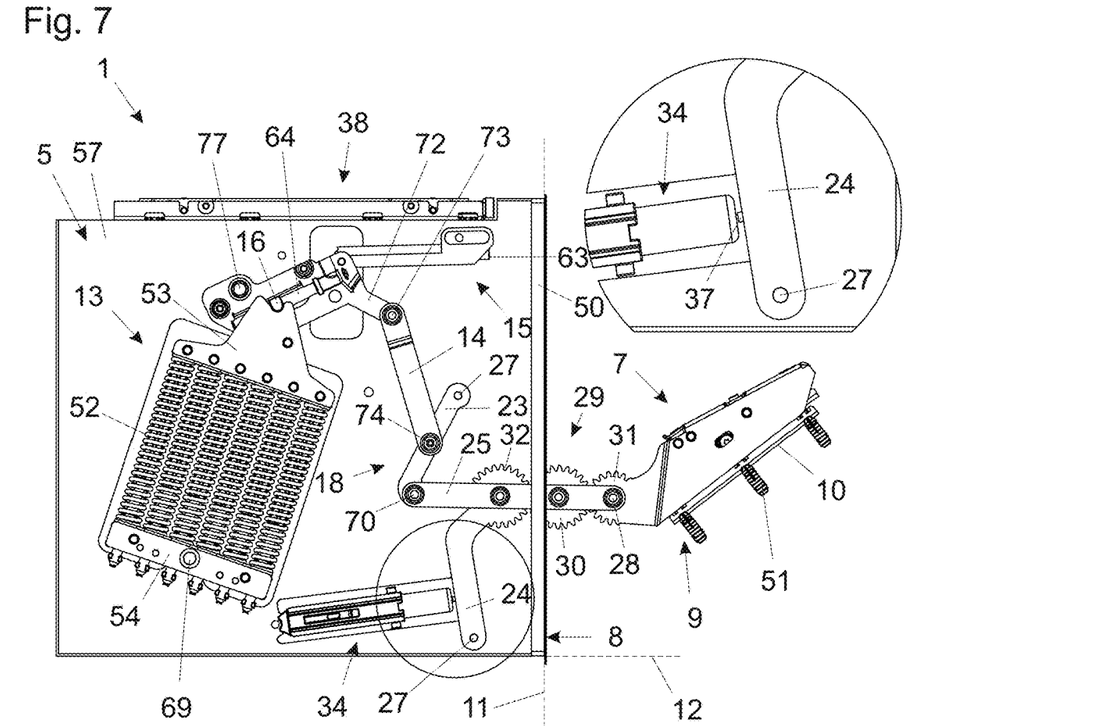
FIG. 7 shows the furniture fitting according to the second embodiment, wherein the positioning arm is arranged in an intermediate position between the two maximum positions, and wherein a schematically illustrated view from the side can be seen, with a side surface of the housing not being illustrated.
Figure 8:
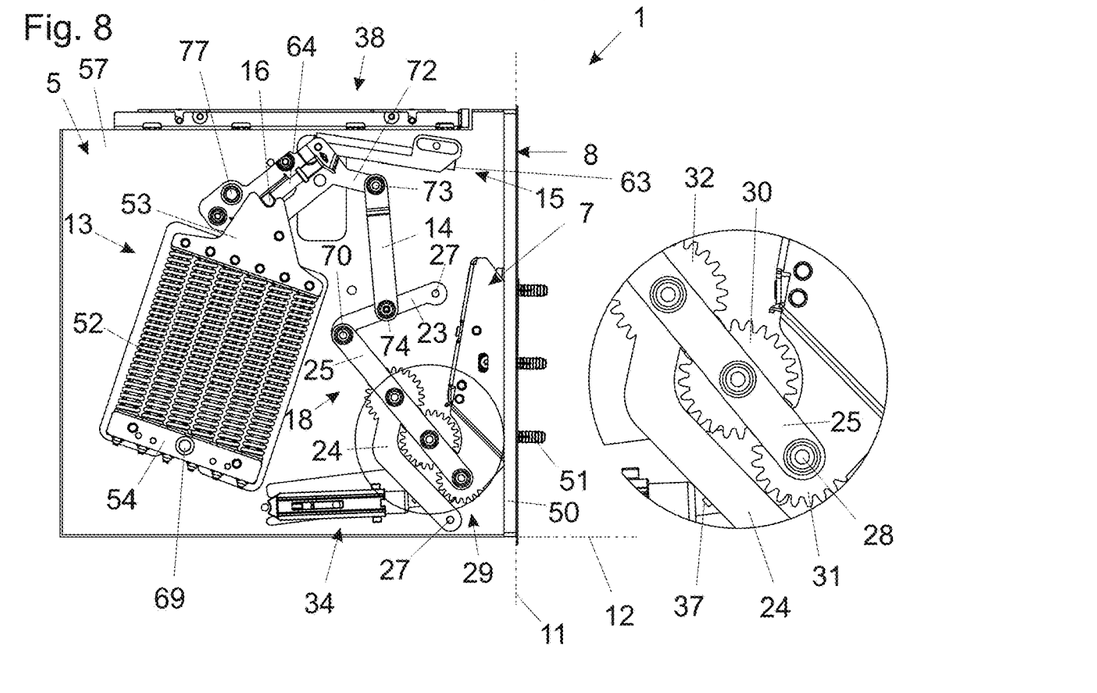
FIG. 8 shows the furniture fitting according to the second embodiment, wherein the positioning arm is arranged in the first maximum position, and wherein a schematically illustrated view from the side can be seen, with a side surface of the housing not being illustrated.

In this case, too, the spring device 13 is mounted pivotably on the housing 5, albeit directly via a pivot point 69 that is fixed with respect to the housing.

The furniture fitting 1 has a setting device 15 with which the force that can be exerted on the positioning arm 7 by the spring device 13 is settable. In this embodiment, a position of a force coupling point 16 of the spring device 13 with respect to the positioning arm 7 is settable by the setting device 15. Otherwise, the setting device 15 is formed similarly to that in the first embodiment. The threaded spindle 64 is arranged on a carrier 72 connected rotatably to the housing 5 via an articulation point 77. The force-deflecting lever 14 is connected to the carrier 72 via a first articulation point 73 and to the lever mechanism 18 via a second articulation point 74.

The positioning arm 7 is connected to the housing 5 via a lever mechanism 18, wherein the lever mechanism 18 in this embodiment is formed as a three-bar arrangement and has three levers 23, 24, 25, two articulation points 27 on the housing side, and one articulation point 28 on the positioning arm side. The lever mechanism 18 furthermore comprises a toothed gear arrangement 29 with a rotatably mounted toothed gear 30 and two toothed ring portions 31, 32 that cooperate therewith. One of the toothed ring portions 31, 32 is arranged on the positioning arm 7. The other of the toothed ring portions 31, 32 is formed on the lever 24. The toothed gear 30 is arranged rotatably on the lever 25. With the aid of the toothed gear arrangement, a defined movement of the positioning arm 7 is possible even though it is directly connected only to a single lever 25. The impression of a "monoarm" arrangement can be created in this way.

The toothed gear arrangement and the lever 25 can be covered at least partially by a cover 33 (indicated by dashed lines in FIG. 6b)).

The furniture fitting 1 has a damping device 34, which is formed as a linear damper, and a coupling device, with which the positioning arm 7 is couplable or coupled to the damping device 34. A movement of the positioning arm 7 proceeding from at least one intermediate position, which is arranged between the two maximum positions, into the second maximum position can be dampened by the damping device 34. The coupling device comprises an actuator 37, which is formed on the lever 24.

The invention claimed is:

1. A furniture fitting for moving a furniture part relative to a furniture carcass about a horizontal axis, the furniture fitting comprising:
   a housing to be arranged on or in a furniture panel of the furniture carcass;
   a positioning arm mounted to be movable relative to the housing, the positioning arm configured to be movable between a first maximum position corresponding to a closed position of the movably mounted furniture part, and a second maximum position corresponding to a maximum open position of the movably mounted furniture part, and the positioning arm being further configured to protrude through a front side of the housing in the second maximum position;
   a fastening interface configured to fasten the movable furniture part on the positioning arm, the fastening interface having a contact surface for contacting the movably mounted furniture part, the fastening interface is configured such that, in the first maximum position of the positioning arm, the contact surface is in a first plane of the front side of the housing and, in the second maximum position of the positioning arm, in a second plane oriented perpendicular to the first plane;
   a linear damping device; and
   a coupling device coupling the positioning arm to the linear damping device,
   wherein the linear damping device is configured to dampen a movement of the positioning arm starting from an intermediate position located between the first maximum position and the second maximum position in both a first direction toward the first maximum position and a second direction toward the second maximum position.

2. The furniture fitting according to claim 1, wherein the coupling device comprises:
   a first coupling device part configured to couple the linear damping device to the positioning arm during movement of the positioning arm in the first direction toward the first maximum position, and a second coupling device part configured to couple the linear damping device to the positioning arm during movement of the positioning arm in the first direction toward the first maximum position.

3. The furniture fitting according to claim 2, further comprising:
a spring device configured to exert a force on the positioning arm; and
a force-transmitting lever connecting the spring device to the positioning arm,
wherein the first coupling device part has a free end configured to abut the force-transmitting lever only during movement of the positioning arm in the first direction toward the first maximum position so as to dampen movement of the positioning arm in the first direction.

4. The furniture fitting according to claim 1, further comprising a spring device configured to exert a force on the positioning arm.

5. The furniture fitting according to claim 4, wherein:
the furniture fitting further comprises a setting device configured to adjust and set the force to be exerted on the positioning arm by the spring device, and/or
the spring device is mounted pivotably on the housing.

6. The furniture fitting according to claim 1, wherein the positioning arm is connected to the housing via a lever mechanism.

7. The furniture fitting according to claim 1, further comprising a fastening device configured to fasten the furniture fitting on or in the furniture panel of the furniture carcass.

8. The furniture fitting according to claim 4, further comprising a force-transmitting lever connecting the spring device to the positioning arm.

9. The furniture fitting according to claim 5, wherein:
the setting device is configured to adjust and set at least one of a preload of the spring device and a position of a force coupling point of the spring device with respect to the positioning arm, and
the spring device is mounted pivotably on the housing via a rocker.

10. The furniture fitting according to claim 6, wherein the lever mechanism:
is a three- or seven-bar arrangement, and/or
has three or four levers, and/or
has two articulation points on the housing side, and/or
has one or two articulation points on the positioning arm side, and/or
has a toothed gear arrangement with a rotatably mounted toothed gear and/or a toothed ring portion, and/or
has a cover at least partially covering levers of the lever mechanism.

11. The furniture according to claim 1, wherein the coupling device includes an angled lever, a driver, and an actuator.

12. A piece of furniture comprising:
a furniture carcass including a furniture panel,
a furniture part mounted to be movable relative to the furniture carcass, and
the furniture fitting according to claim 1 to move the furniture part relative to the furniture carcass
wherein the furniture part is fastened or fastenable on the positioning arm of the furniture fitting via the fastening interface, and
wherein the housing of the furniture fitting, except for the front side thereof, is arranged entirely within the furniture panel of the furniture carcass.

13. The piece of furniture according to claim 12, wherein the housing of the furniture fitting is arranged at a bottom edge of the furniture panel when the piece of furniture is in a use position.

14. The piece of furniture according to claim 12, wherein the furniture part is a furniture flap pivotable relative to the furniture carcass about an axis horizontal in a use position of the piece of furniture, the furniture flap being openable downward proceeding from the first maximum position toward the second maximum position.

15. The piece of furniture according to claim 14, wherein the furniture flap has an inner surface arranged such that, in the first maximum position, the inner surface faces toward the furniture carcass, and an outer surface spaced apart from the inner surface by a material thickness of the furniture flap, the furniture carcass further including a base panel having an inner surface partially defining an interior space of the furniture carcass, and the inner surface of the base panel and the inner surface of the furniture flap are located in a common plane when the positioning arm is in the second maximum position.

16. The piece of furniture according to claim 12, wherein the furniture part is a furniture flap pivotable relative to the furniture carcass about a horizontal axis when the piece of furniture is in a use position, and the furniture panel of the furniture carcass is vertically arranged.

* * * * *